United States Patent Office 2,994,569
Patented Aug. 1, 1961

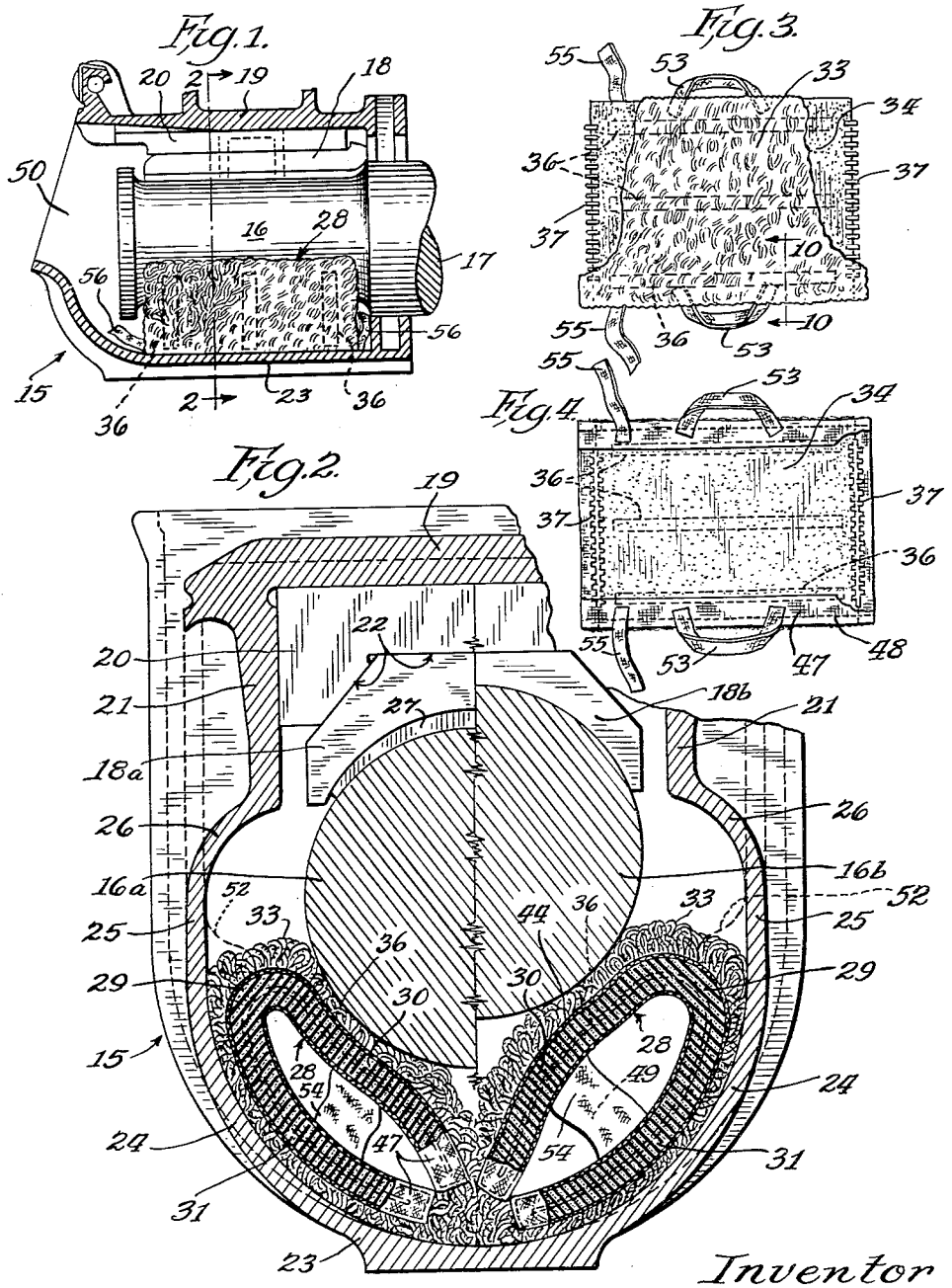

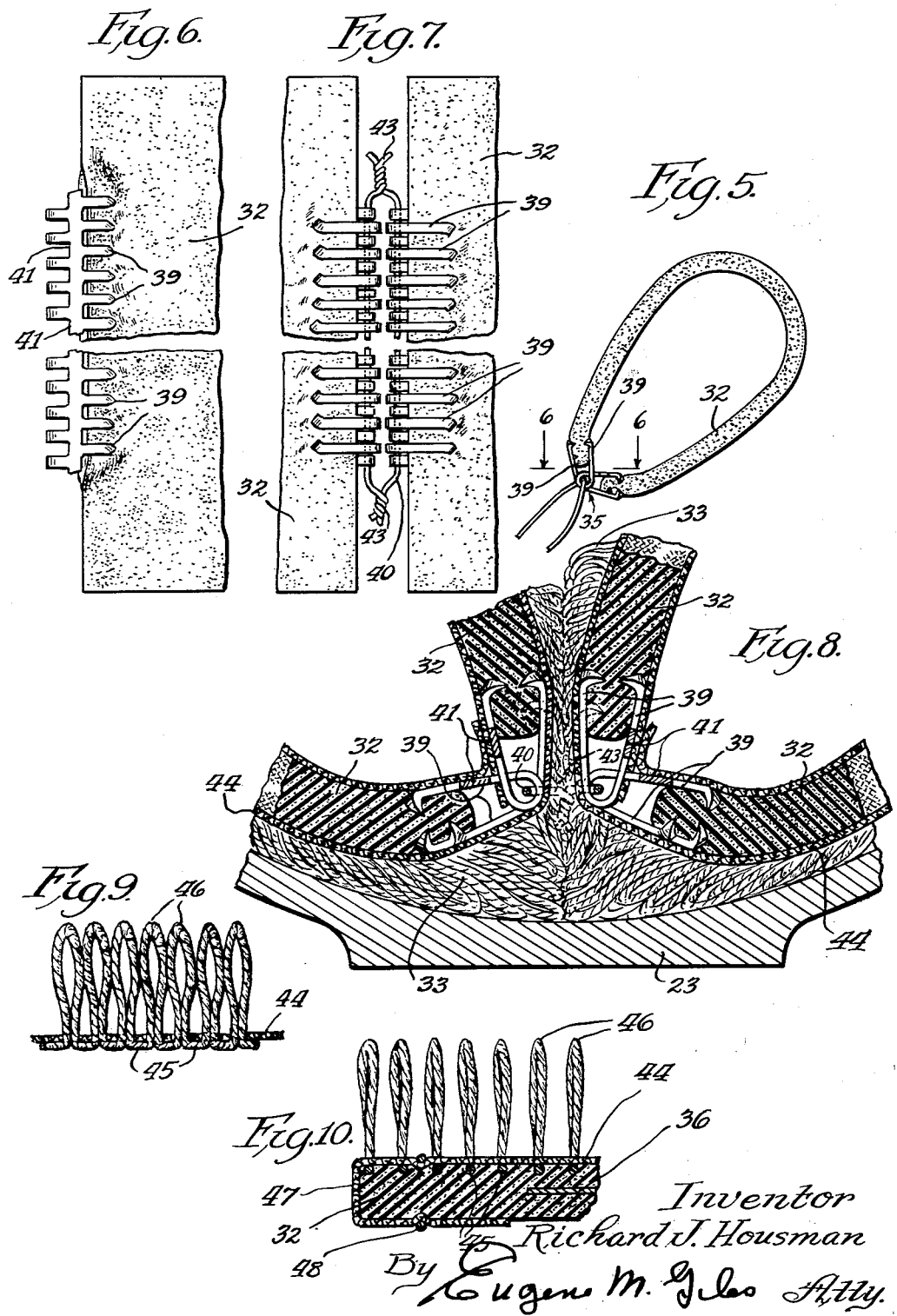

2,994,569
JOURNAL LUBRICATORS
Richard J. Housman, Dolton, Ill., assignor to Cardwell Westinghouse Company, Chicago, Ill., a corporation of Illinois
Filed Dec. 20, 1957, Ser. No. 704,123
7 Claims. (Cl. 308—87)

This invention relates to journal lubricators of the type employed in journal boxes of railroad axles to supply lubricant from an oil reservoir in the bottom of the journal box to the journal therein and has reference more particularly to improved facilities of journal wiper type for communicating and applying the lubricant from the reservoir to the journal, and this application is a continuation in part of my application Serial No. 632,077, which was filed on January 2, 1957.

Such lubricators are required to perform their lubricating function under unusually severe and oftentimes drastic conditions of substantially continuous heavy duty service, including greatly varying speed and load conditions, temperatures which are sometimes abnormally high, considerable jarring and jolting and hammering action which may occur between the journal and bearing, and substantial wearing away of the bearing and also of the journal resulting in considerable change in the position of the journal and its relation with respect to the lubricator.

These conditions require a lubricator of exceptionally sturdy construction which is safeguarded against any detrimental temperature effects, and has no parts which may become broken or loose and impair the journal or bearing, and which provides constant and uniform lubricant supply and proper wiper action at all times to assure uninterrupted application of lubricant to the journal, and wherein its amplitude of resilience of the wiper pressure is such that it adapts itself to any changes of position of the journal which may occur.

In accordance with the present invention, a pair of resilient wiper lobes of elongated tubular form are employed which are flexibly connected to one another in a manner to extend divergently upward at opposite sides respectively of the journal under lateral compression which provides constant and uniform wiping pressure against the journal and the outer surfaces of these lobes have wicking properties to supply lubricant to the journal from a reservoir underneath the journal.

The principal objects of the invention are to provide an improved lubricator which is particularly adapted to withstand the diversified and extreme conditions of use in journal boxes of railroad axles; to insure constancy and permanence of adequate lubrication under such conditions; to provide ample amplitude and uniformity of resilience to follow up journal repositioning occasioned by usage and wear without interference with or impairment of lubricator performance; to safeguard the wiper elements against any detrimental temperature effect; and to provide a simple and convenient lubricator which is readily and economically applicable to conventional journal boxes of railroad axles without modification thereof, these and other objects being accomplished as pointed out more particularly hereinafter and as shown in the accompanying drawings in which:

FIG. 1 is a central longitudinal sectional view, greatly reduced in size, of a railroad axle journal box with the journal end of a railroad axle in operative position therein and provided with a lubricator in accordance with the present invention;

FIG. 2 is an enlarged cross sectional view, on the line 2—2 of FIG. 1, of a journal box and its contents on a scale of approximately one half the actual dimensional size thereof, showing the two opposed wiper lobes of the lubricator respectively in different journal lubrication positions therein for purposes of comparison;

FIG. 3 is a view on a greatly reduced scale looking at the front or lubricating face of a flat panel as prepared to form a wiper lobe therefrom, and having portions of the lubricant transmitting facing material thereof broken away to disclose details of the construction;

FIG. 4 is a view similar to FIG. 3 showing the reverse or rear side of the panel of FIG. 3;

FIG. 5 is an end view, in reduced size, of a lobe backing layer with the opposite ends connected to one another in the wiper lobe form;

FIG. 6 is an enlarged view on the line 6—6 of FIG. 5 of an end portion of the lobe panel and connector element thereof having an intermediate portion broken away;

FIG. 7 is a view showing the manner in which the two opposed wiper lobes of the lubricant are linked to one another;

FIG. 8 is a sectional view on the line 2—2 of FIG. 1, greatly enlarged and showing a bottom portion of the journal box and the connection of the lubricator lobes thereabove;

FIG. 9 is a detail sectional view of the lubricant transmitting facing material of the wiper lobes; and FIG. 10 is a fragmentary sectional view taken on the line 10—10 of FIG. 3 and greatly enlarged of an edge portion of the lobe layer and facing thereof.

Referring to the drawings, which illustrate a preferred embodiment of the invention, the lubricator is shown therein in connection with a conventional journal box, which is indicated as a whole by the reference numeral 15, and has the journal 16 at the end of the axle 17 located therein underneath and in engagement with the bearing shoe 18 which is located in the top of the journal box and supports the load on the journal 16.

The journal box has a load carrying top wall 19 with a block 20 thereunder through which the load is transmitted to the bearing shoe 18 and this block is confined between depending opposite side wall portions 21 and has a cavity 22 in the underside in which the bearing shoe 18 is seated.

The side wall portions 21 extend straight down to approximately the bottom limits of the bearing shoe 18 and therebelow the journal box is of an enlarged somewhat cylindrical form with transversely rounded arcuate bottom 23 the opposite sides of which curve upwardly at 24 to flat continuations 25 thereof to inwardly curved shoulder portions 26 which are joined to the depending side wall portions 21 at the lower extremities of the latter, all as shown in FIG. 2.

The rounded bottom 23 is eccentrically disposed with respect to the journal 16 so that the journal is spaced a greater distance from the bottom 23 at its midwidth than it is from the opposite side wall portions 24 and 25 to provide a spacing of the journal 16 from the journal box which progressively decreases, from the place directly below the journal laterally and upwardly at each side of the journal, and the bottom portion of the journal box is closed at both ends to provide a reservoir in the bottom of the journal box for lubricant which is supplied to the journal, as hereinafter explained, for lubrication thereof.

The eccentric distance of the journal 16 from the bottom of the journal box varies to a considerable extent, as indicated comparatively in FIG. 2, due to the wearing away of the bearing shoe 18 and to a lesser extent of the journal 16 itself, which when originally installed are located and arranged substantially as shown in the left half of FIG. 2 and when worn down by use to permissible limits are arranged substantially as shown in the right half of FIG. 2.

For convenience in referring thereto, the unworn left side halves of the journal 16 and bearing shoe 18 are indicated respectively in FIG. 2 by the reference numerals 16 and 18 with the exponent *a*, and the worn right side halves of the journal 16 and bearing shoe 18 are indicated in said FIG. 2 with the exponent *b*.

The bearing shoe 18, which is usually of brass and initially provided with a layer 27 of babbitt thereon, provides a substantial thickness of bearing material whereby the journal 16 of the initial normal 16$^a$ diameter is spaced a prescribed distance from the bottom 23 of the journal box, but upon continued use the journal rotation and impact of the journal with the bearing, wears away the babbitt 27 and often wears rather deeply into the brass of the bearing shoe, as indicated at 18$^b$ in the right half of FIG. 2 and this, together with some wearing away of the journal 16 itself, eventually repositions the journal at a substantially increased distance from the bottom 23 of the journal box.

For example, the distance of the journal from the bottom of the journal box may be increased as much as three quarters of an inch by wear and it is essential that the lubricator accommodate itself to this repositioning of the journal and maintain normal adequate journal lubrication continuously notwithstanding such repositioning of the journal.

To this end, the lubricator hereof is uniquely constructed and arranged so that it not only will reach the journal readily and unfailingly at any elevation the latter may assume above the bottom of the journal box but will also have unusual flexibility and resilience of such amplitude and constancy that the lubricator follows repositioning of the journal with certainty and uniformity of wiper pressure for persistent and reliable journal lubrication irrespective of the severity of conditions to which it may be subjected.

As shown in the drawings the lubricator is composed of a pair of opposed resilient lobe like wiper elements 28 which are elongated in the direction of the length of the journal for wiping engagement throughout the length of the journal and these elements 28 are hingedly connected to one another near the bottom of the journal box 15 directly below the journal and extend divergently upward respectively at opposite sides of the journal box between the journal and the wall portions 24, 25 at the opposite sides of the journal box.

These lobe members 28 are of tubular construction with openings extending lengthwise thereof and opening through the ends of the lobes for longitudinal stability of the lobes and ventilation thereof, and the openings are defined by transversely arched walls which contribute resilient compressibility of the opposite sides of the lobes toward one another and promote equalization of such compression from end to end of the lobes.

Each lobe member 28 is provided with wicking material for communicating lubricant from the lubricant in the reservoir at the bottom of the journal box to the place of wiping engagement of the lobe against the journal 16 and the lobe may be formed for this purpose with a body or backing 32 having an attached covering 33 on the entire outer side thereof of a material of wicking nature and which, of course extends into the reservoir at the bottom of the journal box and is adapted to communicate lubricant peripherally of the lobe from the reservoir to the place of wiping engagement with the journal.

In the preferred construction disclosed herein each lobe has a body or backing 32 composed of a rectangular panel, such as indicated at 34 in FIGS. 3 and 4, of a width to extend throughout the length of the journal and the panel is folded midway of its length to form a tube of generally oval cross section with the opposite ends of the panel connected, as indicated at 35 in FIG. 5 at the smaller end of the oval.

This panel construction provides a lobe with a rounded return bend 29 at the outer extremity from which reversely curved opposite side wall portions 30 and 31 extend and converge toward one another at the bottom of the journal box where they are connected to one another in a manner to provide a relative swinging relation of the adjoining convergent end portions of the side walls 30 and 31 and also provide a stiffening of the edges of these thus connected end portions throughout substantially the entire length thereof. The thus connected convergent end portions of each panel are linked to the correspondingly connected convergent end portions of the other panel for providing the hinge connection of the lobes to one another.

Each panel 34 is composed of soft compressible cushiony material which is preferably of spongy rubber like nature, such as a blown synthetic rubber compound which is unaffected by the lubricant and preferably of such closed cell texture that it is not appreciably absorptive of lubricant and each panel 34 has incorporated therein at appropriate intervals of its width straight thin metal strips 36 of permanent spring type which extend lengthwise of the panel in parallel relation and preferably terminate a short distance from each end of the panel and which are bent with the panel 34 in the folding thereof and serve to hold the folded panel in the distended oval form and provide a permanent springiness thereto which imparts to the hollow lobe member a relatively constant and uniform characteristic of compressibility and a wide amplitude of such compressibility from the normal oval cross sectional shape to the shape it is required to assume in the journal box.

The spring strips 36 are such that they impose a journal wiping pressure merely of such amount to maintain appropriate lubricating engagement with the journal without any excess of pressure which would tend to promote a glaze or hold the wiping face of the lubricator in a tightly compressed condition of fixed conformity to the journal, and these spring strips may be incorporated in the panel 34 in known manner by placing them in proper position between two thin calendered sheets of blowable synthetic rubber stock which is subsequently blown and cured in a suitable mold to expand the stock to the cellular form and desired thickness and integrate the two sheets so that the springs 36 are safely and completely embedded therein. An overall panel thickness of approximately one half inch is preferred.

Three such spring strips of one half inch width and eight one thousandths thickness have been found suitable and the arcuate form of the lobe walls provides such longitudinal stability of the lobe walls that the spring pressure is distributed quite uniformly throughout the lobe length.

For securing the ends of the panel 34 together to provide the bent oval tubular form thereof shown in FIG. 5, each end portion of the panel has a multiple jawed connector 37 of belt connector type securely clamped thereon beyond the ends of the spring strips 36, as shown in FIGS. 3 and 4, and each said connector 37 is composed of laterally spaced individualized U-shaped clamping elements each having opposed arms 39 with end claws for engaging the panel end therebetween as shown in FIG. 8, and having their loop ends beyond the end of the panel 34 and arranged so that the loop ends of the elements at one end of the panel may be intercalated between the corresponding loop ends of the elements at the other end of the panel to receive a pin or wire 40 through the thus intercalated loop ends to connect the opposite ends of the panel 34 to one another.

This provides a hinged connection of the opposite ends of the panel whereby these ends may swing relatively to one another, but stop means are preferably provided to limit the closing together of the hinge ends of the panel 34 to an included angle of approximately 90 degrees.

These multiple jawed connectors have the arms 39 thereof at one side thereof integrally combined in connected spaced apart series by intervening neck portions 41, as shown in FIG. 6, so the multiple elements are provided in connected strip form, which is advantageous for present purposes not only for convenience in applying but also in order that the multiple element connectors may serve as desirable straight line stiffeners for the opposite ends of the panels 34.

Moreover the multiple element connectors are clamped to the ends of the panel 34 with the neck portions 41 thereof at the inside of the included angle of the hinged together pair thereof, and as thus arranged these respective neck portions come together at the approximately 90 degree angularity to provide stop means to limit the angularity of closing together of the hinged pair of multiple element connectors.

For connecting the thus hingedly connected ends of the folded backing panel 34 of each wiper lobe with the similarly hingedly connected ends of the folded backing panel 31 of the other wiper lobe, a wire 40 with projecting ends 42 is preferably employed for hingedly connecting each pair of the multiple jaw connectors, and the corresponding ends 42 of the two respective wires of the two lobe members 28 are twisted together as at 43 to link the two lobe members together in a double hinged manner in close adjoining relation at the place.

A single wire shaped in hair pin form may be employed in place of the two wires 40 with the arms of the hair pin extending respectively through the two hinged together pairs of multiple connector elements 38, in which event only the free projecting ends of the hair pin legs need to be twisted together.

The covering 33 of each wiper lobe is preferably of coarse terry cloth type with the tufted or pile side facing outwardly and has a base 44 of woven fabric with laterally spaced coarse strands 45 of cotton, or other wicking type material of lubricant permeable type, threaded through the base 44 at close intervals to provide a multiplicity of relatively long loops 46 which collectively provide a heavy loop pile of mat like character at the outer side of the fabric base 44.

The covering 33 is preferably applied to the backing panel 34 while the latter is flat, the covering 33 being provided at its opposite edges with plain margins which are turned under the margins of the panel 34 and stitched thereto as at 48 to secure the terry cloth covering 33 to the panel 34.

The covering 33 is longer than the panel 34 so that the opposite ends of the covering 33 extend over the multiple connector elements 38 which preferably terminate well inwardly from the lines of stitching 48 substantially as shown in FIGS. 3 and 4.

The strands 45 are continuous paths of capillary travel of lubricant from end to end of the covering 33 and when the connector lobes 28 are placed in the lubricating position in the journal box, the generously extended ends of the covering 33 are well submerged in the lubricant in the reservoir at the bottom of the journal box, wherein lubricant is maintained at a level approximately as indicated by the dotted line 49 in FIG. 2, and by reason of the looped strands 45 being continuous from end to end of the covering 33, two way capillary communication of lubricant to the journal is provided, one way of which is from the reservoir upwardly through the terry cloth strands at the inner or journal side 30 of the lobe and the other way of which is from the reservoir upwardly through the terry cloth strands at the outer or journal box wall side 31 of the lobe 28 and over the bend 29 at the top of the lobe and downwardly therefrom at the inner side of the lobe to the journal. By reason of this two way lubricant feed, ample communication of lubricant to the journal 16 is assured.

The lubricator, composed of the two thus linked together tubular lobes 28, is insertable in and removable from the journal box by endwise movement thereof through the customary access opening 50 at the outer end of the journal box and the lobes 28 are of such crosswise width of oval shape in the normal unconfined form of the lobes, that the lobes are confined and compressed in the journal box to such flatter oval shape as to impart an expansive tension providing the necessary journal wiping pressure of such resiliency and amplitude to maintain the requisite pressure of the wiper lobes against the journal for proper lubrication throughout the shifting or repositioning of the journal that may occur on account of wear.

Some journal boxes have internal waste retaining ribs at opposite sides, as indicated by dotted lines at 52, and the lubricator lobes 28 are of such lateral expanse that they are below such ribs and the latter do not interfere therewith.

The cross sectional configuration of the wiper lobes 28 in the normal unconfined form is such that the convexity of the sides 31 thereof matches sufficiently the concavity of the walls of the journal box with which they are engaged in the installed position, that the compression of the lobes in the intervening space between these walls and the journal 16 causes the outer walls 31 of the lobes 28 to fit snugly throughout against the bottom wall 23 and curved side wall portions 24 of the journal box and maintain the lubricator against displacement.

On the other hand the convexity of the other or inner sides 30 of the lobes is presented toward the convex face of the journal 16 which acts against the crown portion of each convex side 30 to flatten and deform the oval shape of the lobe and thus impart the tension to the lobe to insure the required wiper pressure and sufficient amplitude of lobe expansion to follow up changes of position of the journal as the latter and its bearing become worn.

The general direction of pressure of the lubricator lobes 28 against the journal is substantially radially of the latter and when the journal is in the initially installed position as represented in the left half of FIG. 2 the mean line of such pressure is lower down the side 30 of the lobes 28 than it is when the journal is in the worn position as represented in the right half of FIG. 2 and thus in the latter position the place of such pressure application is closer to the upper return bend 29 of the lobe.

The return bend 29 and especially that of the spring strips 36 at that place, which are under contracting pressure in the installed position of the lobes, provides a cantilever type of resilient action of the lobe side 30 which is controlled principally by the return bend 29 and because of the greater proximity of the above mentioned mean line of pressure to the return bend 29 in worn down bearing position of the journal and more distended form of the lobe 28 in that position as represented in the right half of FIG. 2 and the greater distance of that mean line of pressure from the return bend in the initially installed journal position as represented in the left half of FIG. 2, a highly desirable equalization of wiper pressure against the journal throughout the change of position of the journal is provided by the present journal lubricator.

The pile form of the lobe covering is advantageous as it provides a shaggy mat like face composed of individually movable vermicularly arranged elements which may respond to rotation of the journal by sufficient movement or tumbling action to provide changeability of the places of pressure contact to prevent a glaze to occur at any place and moreover this coarse element arrangement provides a sufficiently open texture for ventilation of the mass to minimize heating thereof and transmission of heat from the journal to the backing 32.

Because of the tubular form of the lobes 28, the backing material is subjected to deflection rather than compacting compression and acts primarily in shear rather than in direct compression and accordingly the pressure thereon does not tend to impart a set which might impair the resiliency thereof.

Because of the flexibility of the connection of the panel ends of each lobe and the linking of the lobes to one another some circumferential movement of the lobes is permissible in response to journal rotation to impart sufficient shiftability of the active area of contact of the lobe with the journal so that the wiper action is not of definite constancy at the same place.

Because of the divergent arrangement of the lobes, the place of hinging of the ends of the backing panels to one another and also of the linkage of the lobes to one another are located near the bottom of the journal box and as the capillary facing material extends beyond the opposite ends of each backing panel, constant immersion of the ends of the facing material is not only assured but the panel end connecting and lobe linking facilities are embedded in a mass of the shaggy loop facing of the lobes.

The tubular form of the lobes provides ample opportunity for circulation through the lobes from end to end thereof for adequate cooling and the shaggy surfacing thereon precludes direct communication of heat from the journal to the backing material.

The above described lubricator is completely reversible and may be installed in the journal box not only in reversed endwise position but also in positions of reversal of lobe engagement of the opposite sides of the lobes with the journal box and journal. Thus it may be reversed so that the sides of the lobes indicated by the reference numerals 30 in FIG. 2 are applied against the journal box and the sides indicated by the reference numerals 31 may be applied against the journal.

For convenience in manipulation of the lubricator, each panel is preferably provided at its opposite lateral edges with fabric loops 53 which are secured thereto by the lines of stitching 48 so that each lobe in the folded form has at each end thereof a manipulating loop extending between the opposite sides 30 and 31 as shown at 54 in FIG. 2.

Moreover two straps 55 may be secured to each panel at the opposite extremities of one end thereof, as shown in FIGS. 3 and 4, by the stitchings 48, and the corresponding ones of these straps of the two connected lobes may be secured to one another at their outer ends to provide a central handle loop 56 (see FIG. 1) at each end of the lubricator.

By reason of the above described construction and hinging of the lobes, the outer walls of the lobes not only conform to the rounded bottom of the journal box to hold the lubricator against displacement, but the inner walls of the lobes converge toward the bottom of the journal box sufficiently directly that rotation of the journal tends to press the inner end of the lobe at the downturning side of the journal in a manner to retain the lobes centered in the journal box bottom.

Moreover the place of juncture of the lobes is located sufficiently close to the bottom of the journal box that the inner walls of the lobes diverge in directions of general tangency to the journal which provides a substantial passage underneath the journal for ventilation to cool the journal.

While I have shown and described my invention in a preferred form, I am aware that various changes and modifications may be made without departing from the principles of the invention, the scope of which is to be determined by the appended claims.

What is claimed is:

1. A journal lubricator of the class described for wiping lubricant on the opposite sides of a journal, said lubricator comprising a hinge and a pair of independently compressible wiper lobes extending outwardly from the hinge to swing sidewise toward one another and engage a journal therebetween, each said lobe being a wide resiliently bendable panel having a central return bend extending across the width thereof at the outer end of the lobe and having panel portions extending inwardly therefrom and adjacently clamped at their inner ends to the hinge and thereby providing a part of the panel length at each side of the lobe, said parts being resiliently held by the return bend in separated respective positions of oppositely extending convexity providing maximum compressibility toward one another at the crown of convexity thereof, and each lobe being provided with lubricant permeable means by which lubricant is communicable from the vicinity of the hinge to the exterior of the lobe at said place of maximum compressibility of said parts of its panel toward one another.

2. A journal lubricator as defined in claim 1 in which the clamping of the inner ends of the panel portions to the hinge restricts separation of the panel portions beyond the hinge to an extent to locate the said crown of convexity of the said panel parts nearer to the outer end of the lobe than to the hinge.

3. A journal lubricator as defined in claim 1 in which the panel is laminated and has resilient reinforcing means incorporated therein.

4. A journal lubricator as defined in claim 1 in which the panel has its wicking means at the side thereof which is at the outer side of the lobe.

5. A journal lubricator as defined in claim 1 in which the hinge has a hinge pin pivotally interconnecting two sets of clamping facilities which extend lengthwise of the pin, and each set of said clamping facilities has a separate panel clamped thereto.

6. The combination of a cylindrical journal having a bearing riding on the top part of the cylindrical surface thereof, a journal box containing the journal and bearing, and a removable lubricator in the journal box which communicates lubricant from the bottom of the journal box to the journal, the journal box having a transversely rounded bottom underneath the journal and closed at its opposite ends to provide a lubricant reservoir underneath the journal and the journal box having opposite side walls which are located respectively at opposite sides of the journal and extend upwardly from the opposite sides of said transversely rounded bottom and said journal box having a top wall between which and the journal the bearing is interposed, the lubricator comprising a pair of independently compressible wiper lobes interconnected by a hinge and extending upwardly from the hinge at opposite sides respectively of the journal, each said lobe being a wide resiliently bendable panel having a return bend extending across the width thereof at the upper end of the lobe and having two panel portions leading from the return bend to the hinge and adjacently clamped at their ends thereto, said panel portions being resiliently pressed respectively against and conformed to the journal and the rounded bottom of the journal box by the resiliency of the return bend, one said panel portion of each lobe being thereby conformed substantially throughout its length to said rounded bottom and cooperable with the correspondingly conformed panel portion of the other lobe to hold the hinge at the bottom of the lubricant receptacle and the other panel portion of each lobe being conformed throughout a part of its length to the journal and having the other part of its length leading downwardly from the journal to the hinge and cooperating with the corresponding part of the panel of the other lobe to hold the hinge at the bottom of the lubricant receptacle, each panel having wicking means which communicates lubricant from the reservoir to the journal.

7. A journal lubricator of the class described comprising a relatively thick cushion having a valley extending thereacross approximately midway between two opposite extremities of the cushion with a place of flexure along the bottom of the valley, said cushion having at each of said opposite extremities resilient return bend means resiliently holding opposite sides of the cushion distended away from one another between the respective return bend means and the valley, said cushion having lubricant permeable means by which lubricant is communicable from the valley portion of the cushion to the distended opposite sides of the cushion, the return bend at each of the two extremities being composed at least in part of the midportion of a panel folded over at the respective extremity to provide a return bend and the return bend of the panel at each extremity having two portions of the panel extending therefrom at opposite sides respectively of the cushion toward the valley and each of said two portions has an end thereof connected to a hinge which extends along the bottom of the valley.

References Cited in the file of this patent

UNITED STATES PATENTS

| | | |
|---|---|---|
| 91,000 | Devlan | June 8, 1869 |
| 264,251 | Davis | Sept. 12, 1882 |
| 325,966 | Pierce | Sept. 8, 1885 |
| 1,653,624 | Gingras | Dec. 27, 1927 |
| 2,213,001 | Gundel | Aug. 27, 1940 |
| 2,468,898 | Shingle | May 3, 1949 |
| 2,807,803 | Rockwell | Sept. 24, 1957 |

FOREIGN PATENTS

| | | |
|---|---|---|
| 289,881 | Great Britain | May 24, 1928 |
| 502,985 | Great Britain | Mar. 29, 1929 |
| 417,891 | Great Britain | Oct. 15, 1934 |